United States Patent [19]

Laver

[11] Patent Number: 5,516,472

[45] Date of Patent: May 14, 1996

[54] EXTRUDED SYNTHETIC WOOD COMPOSITION AND METHOD FOR MAKING SAME

[75] Inventor: Terry C. Laver, Oregon, Wis.

[73] Assignee: Strandex Corporation, Madison, Wis.

[21] Appl. No.: 298,034

[22] Filed: Aug. 30, 1994

Related U.S. Application Data

[63] Continuation-in-part of Ser. No. 150,860, Nov. 12, 1993, abandoned.

[51] Int. Cl.[6] .......................... B29C 47/78; B29C 47/36; B29B 13/06
[52] U.S. Cl. ................. 264/118; 264/122; 264/DIG. 69; 425/378.1; 425/382 R; 425/382.4; 428/903.3
[58] Field of Search ..................... 264/109, 115, 264/122, DIG. 69, 118; 425/378.1, 382 R, 382.4; 428/903.3; 524/13, 14, 15, 16

[56] References Cited

U.S. PATENT DOCUMENTS

| | | |
|---|---|---|
| 3,908,902 | 9/1975 | Collins et al. . |
| 3,956,541 | 5/1976 | Pringle ............................. 264/DIG. 69 |
| 3,993,721 | 11/1976 | Soda et al. ............................ 264/45.5 |
| 4,091,153 | 5/1978 | Holman . |
| 4,145,389 | 3/1979 | Smith ..................................... 264/40.7 |
| 4,225,640 | 9/1980 | Erb .................................. 264/DIG. 69 |
| 4,686,251 | 8/1987 | Osterman . |
| 4,708,623 | 11/1987 | Aoki et al. . |
| 4,968,463 | 11/1990 | Levasseur ............................. 264/40.1 |
| 5,002,713 | 3/1991 | Palardy et al. . |
| 5,008,310 | 4/1991 | Beshay ...................................... 524/13 |
| 5,055,247 | 10/1991 | Ueda et al. . |
| 5,082,605 | 1/1992 | Brooks et al. . |
| 5,087,400 | 2/1992 | Theuveny . |
| 5,088,910 | 2/1992 | Goforth et al. . |
| 5,096,406 | 3/1992 | Brooks et al. . |
| 5,124,168 | 6/1992 | McMillin et al. . |
| 5,151,238 | 9/1992 | Earl et al. . |
| 5,238,633 | 8/1993 | Jameson ............................ 264/211.23 |
| 5,416,139 | 5/1995 | Zeiszler ..................................... 524/13 |

*Primary Examiner*—Robert A. Dawson
*Assistant Examiner*—Kenneth M. Jones
*Attorney, Agent, or Firm*—DeWitt Ross & Stevens

[57] ABSTRACT

An apparatus and process for combining an organic fibrous material with a thermoplastic material forming a wood-imitating composite. The mixed material is extruded into a die system comprising a transition die, a stranding die and a molding die. The flow rate of the material through the die system is equalized by preforming the mixed material with the transition die to a shape approaching the end product, stranding the material with the stranding die to form individual strands, and compressing the individual strands with the molding die after it exits the stranding die. The die system may also include an adapter die positioned between the extruder and the transition die which functions to control the amount of mixed material which enters the die system. A product comprised of recyclables shredded and mixed to form a wood-imitating composite from a low-temperature extruder is also provided.

45 Claims, 11 Drawing Sheets

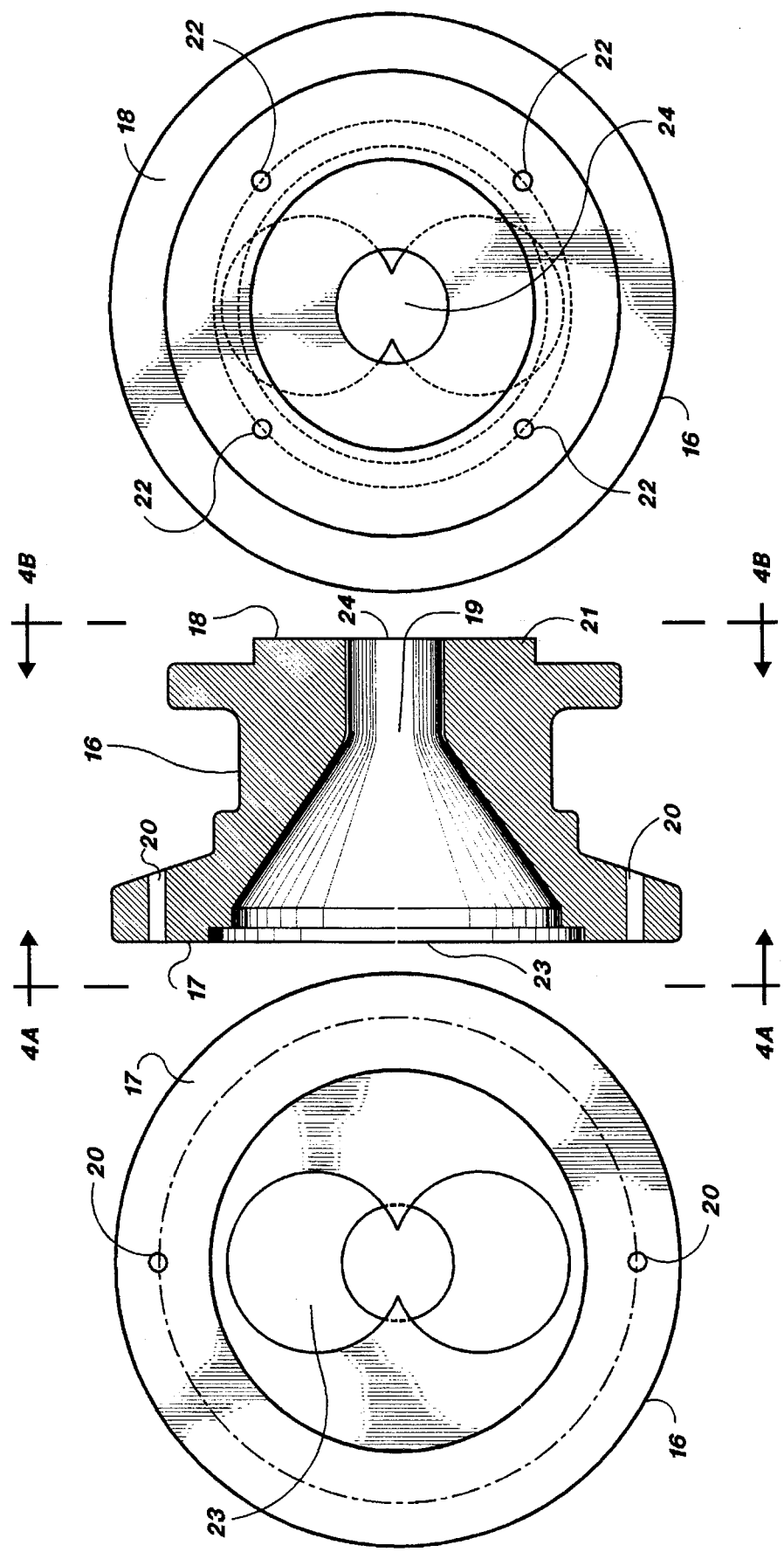

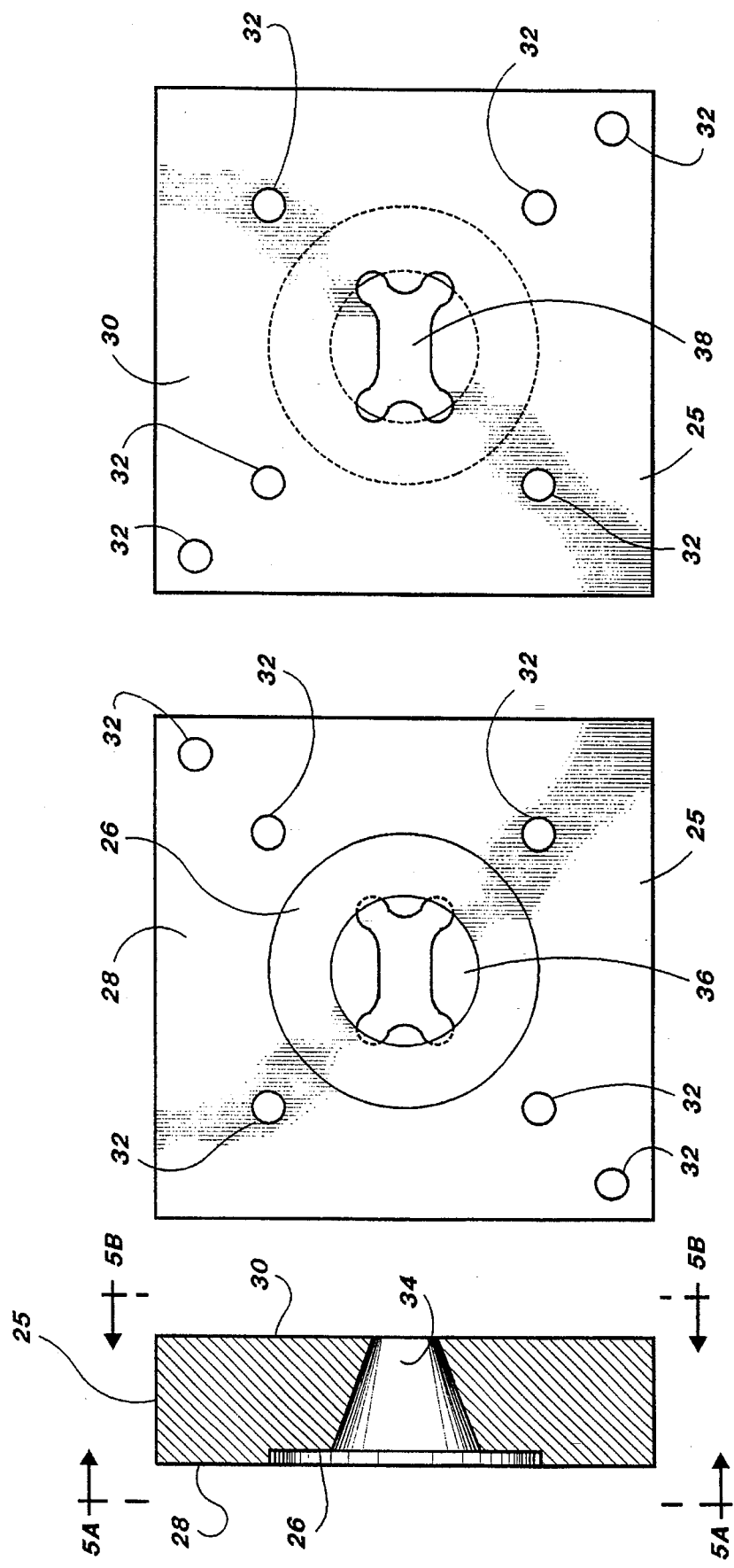

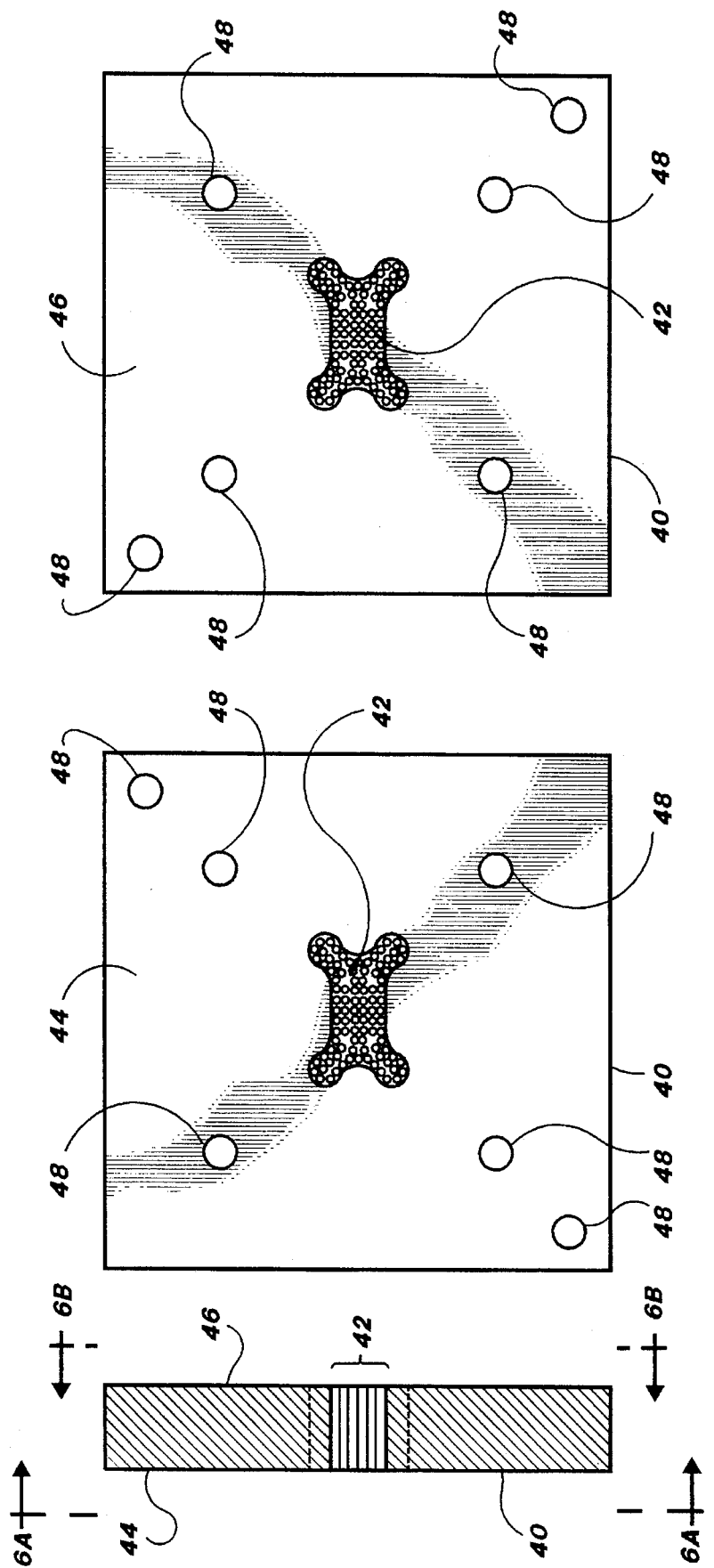

EXTRUDED SYNTHETIC WOOD COMPOSITION AND METHOD FOR MAKING SAME

CROSS-REFERENCE TO RELATED APPLICATION

This application is a continuation-in-part of U.S. application Ser. No. 08/150,860, filed Nov. 12, 1993, now abandoned the full text of which is incorporated by reference herein.

FIELD OF THE INVENTION

The present invention generally relates to wood-like products. The invention particularly relates to an extruded wood-polymer composite material suitable for use in place of natural wood. In addition, the invention relates to a process for manufacturing the composite materials.

DESCRIPTION OF THE PRIOR ART

Although wood is a naturally reproducible resource, the demand for wood is consistently high and the supply of good wood for construction purposes is beginning to diminish. Accordingly, there is an increasing urgency to find alternative sources of wood.

One alternate source is through the production of artificial wood from a mixture of ingredients including recycled wood scraps such as wood meal, wood chips, saw dust and newspapers, which are by-products of industrial wastes in other industries using natural wood products. However, the utilization of recycled wood in the artificial lumber industry is not yet effective for a number of reasons including inefficient manufacturing processes and defects in the resulting products.

Prior art attempts to make artificial wood include a technique where wood is mixed with a thermoplastic resin. According to the prior art, a thermoplastic resin such as polyethylene or polypropylene is mixed with roughly-ground woody or fibrous cellulosic material obtained by chopping waste paper, newspaper, corrugated board or compressed board paper to a small size by means of a cutter. The mixture is introduced into a heated mixer followed by kneading. As the kneading proceeds, the temperature of the mixed materials rises due to the heat generated by friction and shear. As a consequence, the moisture in the waste paper vaporizes, and the waste paper is dried. At the same time, molten thermoplastic resin is mixed into the waste paper. The mixture is then transferred to another mixer and cooled with water to about 20° C. to obtain the composition.

A disadvantage to this process is that the wood meal and the resin are dispersed in a bulky manner resulting in a non-uniform dispersion of the ingredients. Additionally, the thermoplastic resin can be subjected to degradation by oxidation in a heated, molten state. The cellulose may degrade as well.

There are other processes disclosed in the prior an for manufacturing artificial wood products. For example, U.S. Pat. No. 4,091,153 to Holman is directed to producing boards of artificial lumber. The boards are composed of a ligneous fibrous material mixed with a thermosetting resin. In this process, the resin is heat activated and is compressed into arcuate columns to imitate the grain of wood.

U.S. Pat. No. 4,686,251 to Ostermann et. al. also describes a method to produce decorative panels. In the process an epoxy resin is combined with fragments or pieces of wood that were previously heated to a temperature higher than the peak temperature of the resin-reagent mixture. Decorative objects may be produced from the process.

U.S. Pat. No. 5,055,247 to Ueda et. al. describes a process for producing a woody molding that includes adding a dibasic acid anhydride to a woody material such as wood meal in the presence of sodium carbonate. An esterified woody material is then kneaded and heat and press molded.

A similar process is disclosed in U.S. Pat. No. 4,708,623 to Aoki et. al. which discloses a process and apparatus for producing a uniform organic-filler blended resin composition. The originating materials are an organic filler such as waste paper and a thermoplastic resin. The process involves an extruder providing many projections and grooves that knead the materials causing them to combine more completely.

A method for compression molding articles from lignocellulosic materials is disclosed in U.S. Pat. No. 5,002,713 to Palardy et. al. This patent discloses a method to produce particle board panels made from wood flakes or other lignocellulosic materials with a high moisture content. The method utilizes a catalyst to accelerate the reaction binding the flakes or particles.

U.S. Pat. Nos. 5,151,238 to Earl et. al., 5,087,400 to Theuveny and 3,908,902 to Collins et. al. all disclose processes for producing a composite material in which a cellulosic substrate is treated with a polymer and then compressed.

U.S. Pat. Nos. 5,088,910 to Goforth et al. and 5,082,605 to Brooks et al. disclose a method for making a synthetic, composite wood product in which scrap wood or cellulosic fibers are combined with waste plastic materials, preferably high or low density polyethylene. U.S. Pat. No. 5,096,406 to Brooks et al. is directed to the extruder assembly used in the process disclosed in the '605 patent to Brooks et al.

In the prior art processes the composites are generally processed at high temperatures which slow down the process and cause the polymer to degrade. Further, these processes require uniform, sorted raw material which also slows down the operation.

SUMMARY OF THE INVENTION

The present invention overcomes many of the deficiencies of the prior art by providing a process for the production of a composite material from particles of cellulosic material comprising the steps of combining the cellulosic material with a sufficient amount of thermoplastic material to form a combined product; extruding the combined product under sufficient conditions to blend the combined product together into a homogenous mixture; passing the homogenous mixture through a transition die to preshape and expand the homogenous mixture; passing the homogenous mixture through a stranding die to form a plurality of adjacently positioned strands of homogenous mixture; and passing the plurality of strands through a molding die for a time sufficient to compress the strands together and bond the strands to each other.

The present invention is also directed to a low-temperature extruder system for forming a composite molded extrudate from a mixture of organic fibrous material and thermoplastic material, comprising a hopper to receive and form a mixture of the organic fibrous material and the thermoplastic material; an extruder to extrude the mixture; a first transition die comprising an aperture to receive the mixture and form it to an initial shape and to extrude the formed mixture; a second stranding die, connected to the first transition die, provided with a plurality of stranding apertures to receive and shear the formed mixture into a plurality of individual strands each having an exterior surface; a third molding die, connected to the second stranding die, provided with an aperture to receive and compress the individual strands into a final molded shape; and a fourth shaping die, connected to the third molding die, provided with an extrudate shape-forming aperture for molding the molded extrudate.

The present invention is also directed to a process for the production of a composite material from particles of cellulosic material comprising the steps of drying the cellulosic material to a moisture content between about 1% and 9%; combining the cellulosic material with a sufficient amount of thermoplastic material in the presence of a cross-linking agent and a lubricant to form a combined product, wherein the ratio of cellulosic material to thermoplastic material is between approximately 4:1 and 1:0; extruding the combined product under sufficient conditions to blend the combined product together into a homogenous mixture, wherein the combined product is extruded at a temperature between about 100° F. and 400° F., and wherein the flow rate of the extruder is between approximately 100 and 2500 pounds per hour; passing the homogenous mixture through a transition die to preshape and expand the homogenous mixture; passing the homogenous mixture through a stranding die to form a plurality of adjacently positioned strands of homogenous mixture, wherein each of the plurality of adjacent positioned strands has a surface temperature hotter than an interior temperature of each strand; passing the plurality of strands through a molding die for a time sufficient to compress the strands together and bond the strands to each other; passing the strands through a settling die for a time sufficient to bond the individual strands together to a molded extrudate; spraying the molded extrudate with a cooling fluid sufficient to impart a hardened glaze on the molded extrudate; and cooling the formed product.

A low-temperature extruder system for forming a composite molded extrudate from a mixture of organic fibrous material and thermoplastic material, comprising: a hopper to receive and form a mixture of the organic fibrous material and the thermoplastic material; an extruder to extrude the mixture; an adapter die connected to the extruder, the adapter die being provided with an aperture to control the quantity of mixture flowing from the extruder; a first transition die comprising an aperture to receive the mixture and form it to an initial shape and to extrude the formed mixture, wherein the first transition die comprises a first front face having a generally round orifice and a second rear face having an orifice similar to a shape of a finished product; a second stranding die, connected to the first transition die, provided with a plurality of stranding apertures to receive and shear the formed mixture into a plurality of individual strands each having an exterior surface, wherein the second stranding die comprises a first surface and a second surface, comprising: a plurality of gas evacuation channels located on the first surface of the second die to receive and evacuate gases discharged from shearing the formed mixture; and a plurality of gas evacuation vents, having inlets located on the first surface connected to the gas channels and outlets located on the second surface, for receiving and evacuating gases from the gas evacuation channels, wherein the gas evacuation vent outlets have a larger circumference than the inlets, providing a venturi effect to increase gas evacuation efficiency; a third molding die, connected to the second stranding die, provided with an aperture to receive and compress the individual strands into a final molded shape, wherein the third molding die comprises a first front face equivalent in shape to the second rear face of the first transition die and a second rear shape-forming face to form the shape of the molded extrudate; a fourth shaping die, connected to the third molding die, provided with an extrudate shape-forming aperture for molding the molded extrudate; and a spray head system for receiving the molded extrudate passing from fourth shaping die.

The present invention is also directed to a simulated wood composite material which comprises approximately ⅔ organic fibrous or cellulosic material and approximately ⅓ thermoplastic material in combination. The product has an appearance similar to wood, and may be sawed, sanded, shaped, turned, fastened and/or finished in the same manner as natural wood.

A primary advantage of the present invention is that the starting mixture can be continuously processed at lower temperatures than those typically used to combine cellulosic fibrous material with polymeric materials. Because of the low temperature, the process is less expensive, which makes it more economically efficient and also more energy efficient. The cross-linking chemistry that is used in the extrusion process is more economically efficient than the relatively expensive compression type molding.

Because of the low temperatures, the die system configuration, and the individual strands used to form the final shape, traditional flow problems associated with solid part extrusion are eliminated. Very sharp edges and corners and very intricate shapes are therefore possible directly out of the die system.

Other advantages are as follows: (1) virtually any type of virgin or recycled material may be used for either the cellulosic fiber or thermoplastic components; (2) the resulting product does not expand after leaving the molding die; (3) any desired length of finished material may be manufactured using the extrusion process as opposed to the fixed lengths obtained from compression type molding; and (4) because it is largely inert, the product will also outlast wood many times over. It is not only resistant to rot and decay, it is also impervious to termite attack.

The present invention produces a composite product that allows for improved "workability" such as sanding, sawing, etc. The improved workability is brought about by the reaction between the bonding agents and the fibrous strands.

The cellulosic fiber-polymer product may be used for decorative moldings inside or outside of a house, picture frames, furniture, porch decks, window molding, window components, door components, roofing systems and any other type of use where structural requirements do not exceed the physical properties of the composite.

Reference is now made in detail to the preferred embodiments of the invention, examples of which are illustrated in the accompanying drawings.

BRIEF DESCRIPTION OF THE DRAWINGS

In the drawings:

FIG. 4 is a cross-sectional view of the adapter die plate of FIG. 2.

FIG. 4A is a front elevated view of the adapter die plate of FIG. 4, taken along lines 4A—4A of FIG. 4.

FIG. 4B is a rear elevated view of the adapter die plate of FIG. 4, taken along lines 4B—4B of FIG. 4.

FIG. 5 is a cross-sectional view of the transition die plate of FIG. 2.

FIG. 5A is a front elevated view of the transition die plate of FIG. 5 taken along lines 5A—5A of FIG. 5.

FIG. 5B is a rear elevated view of the transition die plate of FIG. 5 taken along lines 5B—5B of FIG. 5.

FIG. 6 is a cross-sectional view of the stranding die plate of FIG. 2.

FIG. 6A is a front elevated view of the stranding die plate of FIG. 6 taken along lines 6A—6A of FIG. 6.

FIG. 6B is a rear elevated view of the stranding die plate of FIG. 6 taken along lines 6B—6B of FIG. 6.

FIG. 10A is a front elevated view of the molding die plate of FIG. 10 taken along lines 10A—10A of FIG. 10.

FIG. 10B is a rear elevated view of the molding die plate of FIG. 10 taken along lines 10B—10B of FIG. 10.

FIG. 11A is a front elevated view of the setting die plate of FIG. 11 taken along lines 11A—11A of FIG. 11.

FIG. 11B is a rear elevated view of the setting die plate of FIG. 11 taken along lines 11B—11B of FIG. 11.

DETAILED DESCRIPTION OF THE INVENTION

Figure 1:
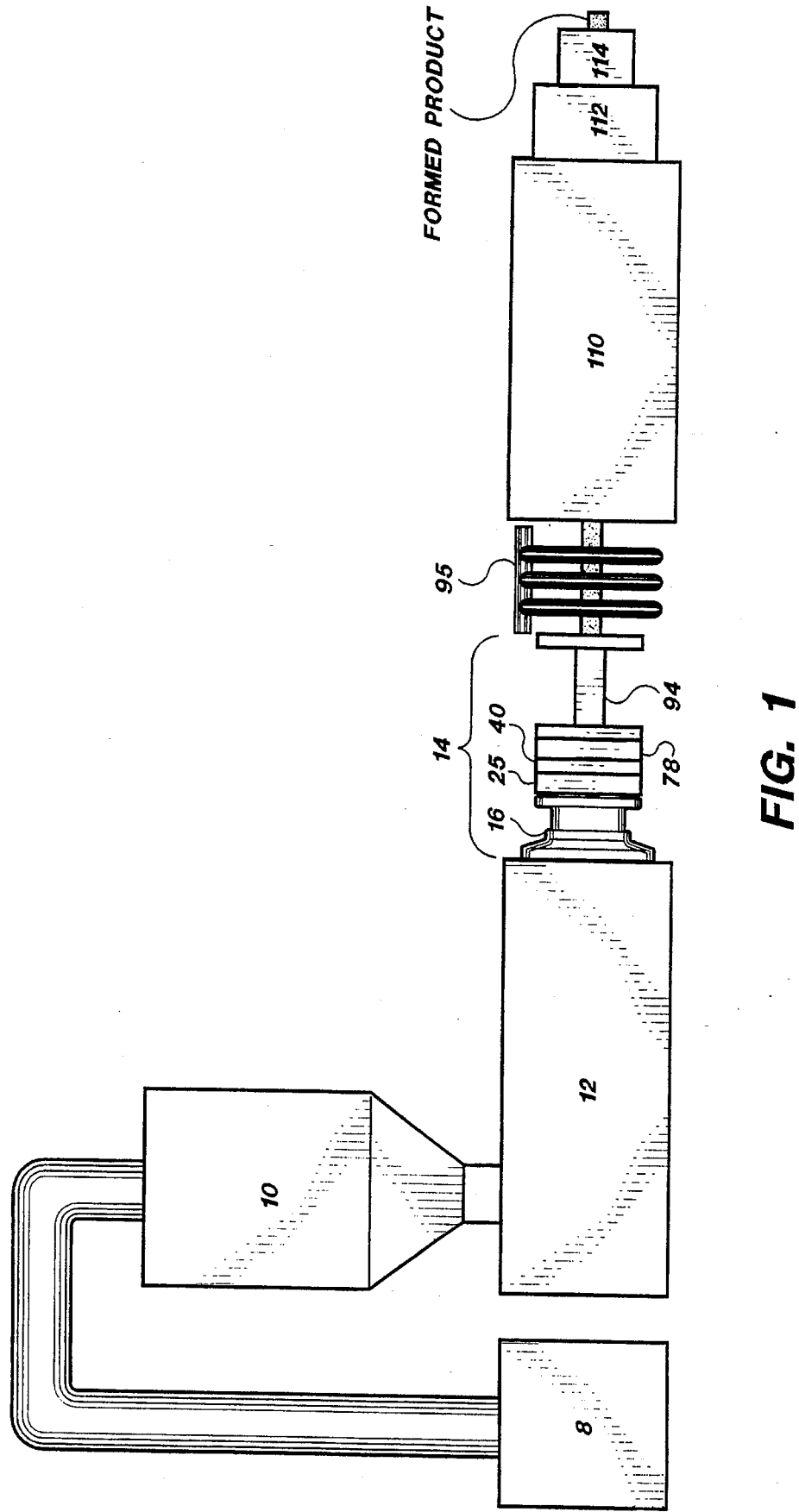
FIG. 1 is a flow chart illustrating the process of the present invention.

The present invention is directed to a wood-polymer composite product, as well as the process and machine for making the product. The invention is specifically directed to the combination of a low-temperature extruder and the die system.

The unique die system of the present invention allows the combined starting materials to bond into a shaped, homogeneous product. The extruded material is introduced through the adapter die and reshaped and slightly expanded in the transition die. The material is then separated into individual strands in the stranding die. The shearing action of the stranding die creates local high temperatures on the exterior surface of each individual strand, while leaving the bulk interior of each strand at a much lower temperature. The strands are then compressed and shaped in the molding die. The flow of the extruded material through the die system is balanced by passing the extruded material through the transition die prior to passage through the stranding die and passing the stranded material through a molding die subsequent to passage through the stranding die. The die system configuration equalizes the flow at the outside edges of the shaped composite material with the flow at the center of the shaped composite material to produce a product having a uniform substructure that is similar to the grain in a true wood product.

As the individual strands are pressed against each other, the localized high temperature present on the outer surface of each strand causes the strands to bond to adjacent strands. In the setting die, the final shape is maintained while the individual strands and the individual cellulose molecular chains continue to bond together. The formed product is then cooled in a cooling tank and transported over rollers by a pulling mechanism. The cooled product is cut into desired lengths.

The cellulosic fibrous-polymer composite material of the present invention is characterized by having a higher cellulosic fiber content than normally recognized in the prior art. While the prior art normally requires a material content including approximately 50% fiber to 50% thermoplastic material, the material of the present invention has a higher fiber content. The material can have a up to a 1:0 fiber/thermoplastic content by employing the continuous low temperature extrusion process of the present invention and the proper mix of starting materials.

The basic process requires mixing of basic types of raw materials including cellulosic fibers and thermoplastic materials. Cross-linking agents and process lubricants may also be included in the basic mixture.

Cellulosic Materials:

One advantage of the present invention is that it can incorporate virtually any kind of waste cellulosic material from sawdust to pond sludge and newspapers. As described earlier, any cellulosic material may be used as a raw material including old newspapers, alfalfa, wheat pulp, wood chips, wood particles, wood flour, wood flakes, wood fibers, ground wood, wood veneers, wood laminates, kenaf, paper, cardboard, straw, and other cellulosic fibrous materials.

The cellulosic fibrous material may also comprise refined cellulose such as cotton or viscous and plant fibers such as kenaf, bamboo or palm fiber, straw or any other cellulosic fibrous material.

Prior to being combined with the other starting materials, the cellulosic materials should be dried to a moisture content between approximately 1% and 9%. A preferred moisture content is no more than 2%. Drying technologies are known to the art. A suitable example is a desiccant dryer manufactured by Premier Pneumatics, Inc. (Allentown, Pa.).

Thermoplastic Materials:

The thermoplastic materials serve primarily as a process fluidizer. Most types of thermoplastic materials may be used, examples of which include multi-layer films, virgin thermoplastics such as polyethylene, polypropylene, poly-vinyl chloride (PVC), low density polyethylene (LDPE), copoly-ethylene-vinyl acetate and waste plastic sawdust from other industries as well as other recyclable polymer materials. Although thermoplastic materials are a preferable component in the make-up of the starting materials, it is not required. As long as the starting material includes a sufficient amount of cross-linking agents and lubricants to "plasticize" the mixture in the extruder, the starting materials do not necessarily require the use of thermoplastic materials.

The ratio of cellulosic fibers to the thermoplastic material is, therefore, between approximately 4:1 and 1:0. Preferably the ratio between the cellulosic fibers to the thermoplastic material is approximately 1:1.

Cross-Linking Agents:

The cross-linking agent serves to strengthen the bond between the several strands of the cellulosic fibers into a final homogenous product. The cross-linking agents bond across the pendent hydroxy groups on the cellulose molecular chain. Cross-linking agents must have the characteristics of forming a strong bond at relatively low temperatures. Examples of cross-linking agents include polyurethanes such as isocyanate, phenolic resins, unsaturated polyesters and epoxy resins and combinations of the same. The phenolic resins may be any single stage or two stage resin preferably with a low hexane content. Although the starting material may comprise a cross-linking agent to strengthen the bonds between the cellulosic fiber strands, the cross-linking agent is not required to form the final product contemplated by the inventive process as long as thermoplastic and cellulosic materials are included in the starting material.

Lubricants:

Lubricants, which are common commercial lubricants known to the art of plastic processing, behave as a process aid. Examples of typical lubricants include zinc stearate, which is an internal lubricant and paraffin-type wax, which is an exterior lubricant.

Other Materials:

Other materials, which can be added, are known to the art of extrusion and include accelerators, inhibitors, enhancers, compatibilizers and blowing agents.

Accelerators, inhibitors, enhancers and compatibilizers are agents which control the speed at which the cross-linking agents work.

Accelerators are added to increase the speed of the cross-linking reaction. Examples of accelerators include amine catalysts such as Dabco® BDO (Air Products, Allentown, Pa.) and DEH40® (Dow Chemical).

Inhibitors are added to retard the speed of the cross-linking reaction. Example of known inhibitors include organic acids such as citric acid.

Enhancers are used to increase the reactivity between components. Examples of enhancers include cobalt derivatives.

Compatibilizers are used to form a more effective bond between cellulosic materials and thermoplastics. Examples of compatibilizers include ethylene-maleic anhydride copolymers.

Blowing agents are added to decrease density. An example of a blowing agent is CELOGEN® TSH (Uniroyal Chemical).

There are many formulation recipes which can be prepared for the starting mixture. The following table includes four examples (expressed in pounds of material):

| RECIPE | I | II | III | IV |
| --- | --- | --- | --- | --- |
| Wood Flour | 25.00 | 25.00 | 25.00 | 25.00 |
| Polyethylene | 15.00 | 12.50 | 15.00 | 7.50 |
| Zinc Stearate | .75 | 1.50 | 1.00 | 1.25 |
| Wax | .50 | .50 | .50 | .75 |
| Phenolic Resin | 1.50 | .00 | .00 | 8.50 |
| Isocyanate | .50 | 1.00 | .00 | .00 |
| Epoxy Resin | .00 | .00 | 2.50 | .00 |
| Catalyst | .00 | .00 | .075 | .00 |

The preferred formulation is as follows:

| MATERIAL | AMOUNT (PARTS) |
| --- | --- |
| Wood Flour (40 Mesh) | 100.0 |
| Polyethylene (HDPE) | 40.0 |
| Zinc Stearate | 3.0 |
| External Wax | 2.0 |
| Phenolic Resin | 6.0 |
| Polyurethane | 2.0 |

The wood flour is dried to 2% moisture content or less. The polyethylene (HDPE) and polyurethane are mixed in a ribbon blender until absorbed, approximately five minutes. The remaining ingredients are added to the mixture, and blended for approximately three minutes or until evenly mixed under conditions known to the art.

Referring now to the figures, wherein the same reference numbers relate to the same or similar features throughout the figures, FIG. 1 illustrates a flow diagram of the process of the present invention.

Hopper:

In the first step, the cellulosic fiber and thermoplastic raw materials are first shredded according to methods known to the art, physically mixed with cross-linking agents and process lubricants in a blender 8, and subsequently placed into a feed hopper 10.

The cellulose materials are comminuted by conventional particle reduction equipment known to the art. These may include grinders, ball mills, choppers or other equipment capable of reducing the fiber to a flour of a distinct particle size or range of sizes. A 40-mesh flour appears to be the best form but good results have been obtained with both coarser and finer materials.

The mixing of the materials prior to loading the extruder may be accomplished by any simple mixing device. No heat is required during mixing and only an even distribution of the various components is required. A drum tumbler may be used for small quantities or a larger batch-type mixer such as a ribbon blender known to the art may be used.

A typical feed hopper used in this process may be a gravity feed, starve feed or force feed (also known as a "crammer") hopper, depending on the flow characteristics of the particular compound.

Extruder:

This mixture of raw materials is then delivered to a heated extruder 12. The extruder 12 utilizes low temperature mixing and extruding. This is unique in that most plastic mixing processes require mixing at a plasticization temperature, which is quite high. The present mixing temperature is substantially lower, preferably around 180° F. The material passing through the extruder creates a mass of homogenous material at a certain temperature, approximately 185°–200° depending upon the particular compound.

The present invention can be processed with any capacity extruder. A counter-rotating and intermeshing twin screw, high pressure, extruder manufactured by Cincinnati Milacron (CM-55-HP) may be used in the preferred embodiment.

Preferably, the process is accomplished by twin screw extruders, which are heated to process temperatures sufficient to blend the product together into a homogenous mixture at low temperature.

Temperature:

In the low temperature, high pressure extruder, the materials are blended, heated and then forced into a die system. Unlike the intended or prior art purpose of typical heated extruders, which heat the product to plasticization temperatures, the extruder of the present invention requires only that the product be brought to a blending or homogenizing temperature, which is less than plasticization temperatures.

The temperature of the extruder used in the present invention is controlled by the extrusion speed, external extruder heaters, shearing action and heaters in the die system and monitored by thermocouples and other monitoring circuits. The purpose of the thermocouples is to monitor the heat at each station. The bulk temperature is significantly lower, e.g., about 150°–200° F., than the "true melt" of the thermoplastic fluidizers.

Flow Rate:

The flow rate of the extruder may be between about 100 and 2500 pounds per hour. In the preferred embodiment the flow rate is approximately 600 pounds per hour with a temperature at approximately 180° F.

The product leaving the extruder is essentially unbounded round stock. Various sized extruder orifices are available with a range from 25 millimeters (mm) to 72 mm. In the preferred embodiment a 38 mm orifice is used.

Die:

The materials are blended, heated and then extruded into a die system 14. The die system 14 is made up of a series of plates, which will be explained below with reference to FIGS. 2 and 3. The unique die system 14 allows the starting materials to bond and form a shaped-homogeneous product. Each of the plates can be made of materials known to the art to accomplish the necessary purpose. Typical materials include cast iron and stainless steel.

Figure 2:
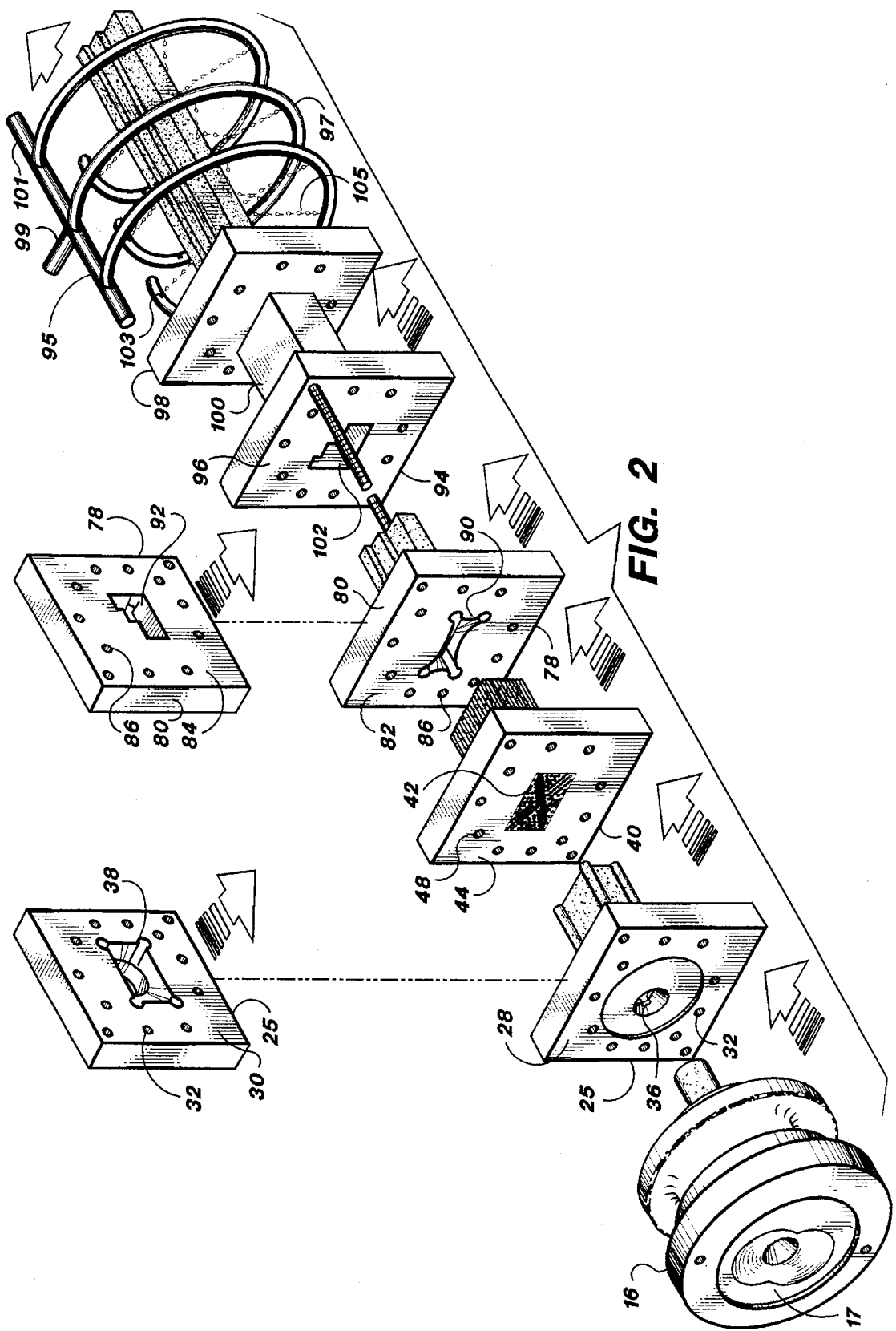
FIG. 2 is a cross-sectional view of the die system of the present invention illustrating each of the die plates.

The amount of volume of material allowed into the die system 14 is controlled by the adapter die 16, which is illustrated in detail in FIGS. 4, 4A, and 4B, and further by the shapes of the transition die 25, stranding die 50 and molding die 78, which are explained with reference to FIGS. 2 and 3. As previously described, this die configuration functions to balance the flow of the material thereby allowing for the production of uniform end product.

Figure 3:
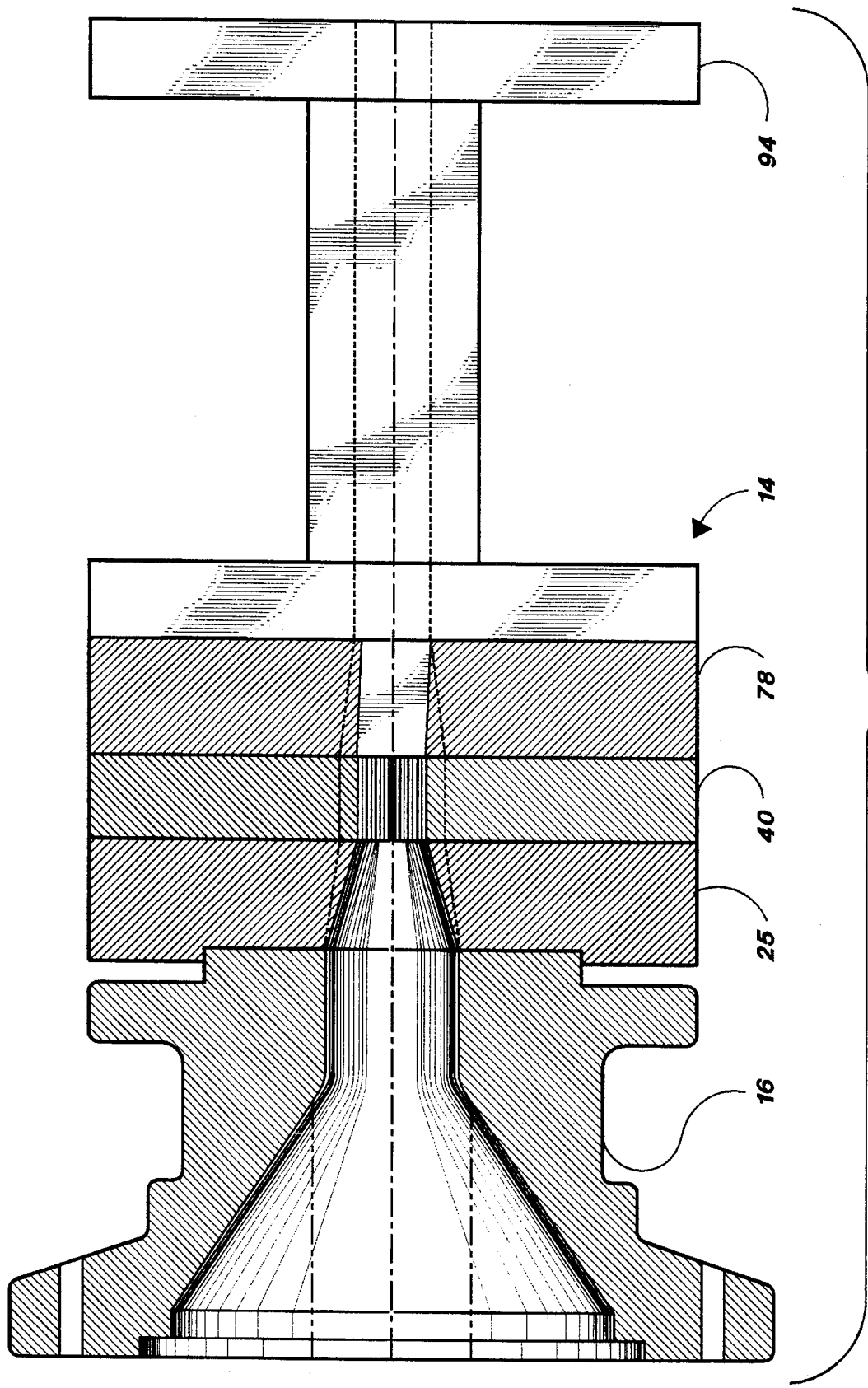
FIG. 3 is a cross-sectional view of the die system of FIG. 2.

FIG. 3 illustrates a cross-sectional view of the die system 14 of the present invention. As previously indicated, the individual die pieces contained within the die system 14 comprise the adapter die 16, the transition die 25, the stranding die 50, the molding die 78, and the setting die 94. The individual die pieces are nested together to form one continuous die.

Extrusion Plate:

The adapter die 16 acts to connect the die system 14 to the extruder 12. As illustrated in FIGS. 3 and 4, the adapter die 16 includes a front face 17, shown in FIG. 4A, a rear face 18, shown in FIG. 4B, and a conduit 19. The conduit 19 narrows in diameter from the front face 17 to the rear face 18.

FIG. 4A shows a front elevated view of the adapter die 16. The front face 17 of the adapter die 16 comprises a figure eight orifice 23, which can accommodate a twin screw extruder, at the end of the conduit 19 nearest the extruder 12. Bolt holes 20 are contained near the edge of the front face 17 of the adapter die 16 to secure the adapter die 16 to the extruder 12.

FIG. 4B shows a rear elevated view of the adapter die 16. The rear face 18 of the adapter die 16 comprises a circular orifice 24 which is located at that end of the conduit 19 which is nearest to the transition die 25. The rear face 18 of the adapter die 16 further comprises an extended portion 21 which is designed to nest within a shallow channel 26 which comprises part of the transition die 25. A second set of bolt holes 22 are contained within the extended portion 21 of the rear face 18 of the adapter die 16 to secure the rear face 18 of the adapter die 16 to the transition die 25.

The circular orifice 24 controls the volume of extruder material allowed into the die system 14. Typically, the circular orifice 24 is available in sizes ranging from 50 mm to 300 mm.

Transition Die:

The extruded material is reshaped and slightly expanded in the transition die 25, illustrated in FIGS. 5, 5A, and 5B. Generally, the transition die 25 is a square-shaped metal plate, approximately one and one-half inches thick having a front face 28, a rear face 30 and bolt holes 32. The bolt holes 32 extend from the front face 28, through the material to the rear face 30. They are used to assemble all of the various dies into the die system and may be located in the same position on each die. The front face 28 also includes a shallow channel 26, previously described with reference to the adapter die 16, which allows the adapter die 16 to be seated within the transition die 25.

The transition die 25 further comprises a conduit 34 which transforms the combined material discharged from the round stock exiting the circular orifice 24 of the adapter die 16 to a shape more generally approaching that of the finished product. This function of the transition die 25 serves to equalize the flow rate at the outer edges of the extruded material with the flow rate at the center of the extruded material. The conduit 34 comprises a first circular shaped orifice 36 located at the front face 28 of the transition die 25 and a second oblong shaped orifice 38 located at the rear face 30 of the transition die 25. The oblong shape of the second orifice 38 approaches the shape of the finished product.

Stranding Die:

The material is then separated into individual strands in a stranding die 40. The stranding die 40 contains a plurality of apertures 42 and is illustrated in FIGS. 6, 6A, and 6B. The standard stranding die 40 is a square-shaped metal plate, approximately 1½ inches thick, which comprises a front first face 44, a rear second face 46 and bolt holes 48 for assembly. The multiple apertures 42 pass through the stranding die 24 and are arranged in a manner which facilitates proper volume distribution for the final product.

FIGS. 6A and 6B show the multiple apertures 42 contained within an oblong shaped area similar to the shape of the second orifice 38 contained within the transition die 25. All of the apertures 42 may be substantially round, are contiguous through the material substantially parallel to each other and maintain a constant shape from the front first face 44 to the rear second face 46. One preferred embodiment of the stranding die contains apertures which are approximately one-eighth of an inch in diameter. Ideally, the aperture size is dependent upon the size of the end structure. The aperture area of individual strands may be constant throughout a part or may vary indicating the desired density or volume requirements at certain part locations.

Figure 6C:
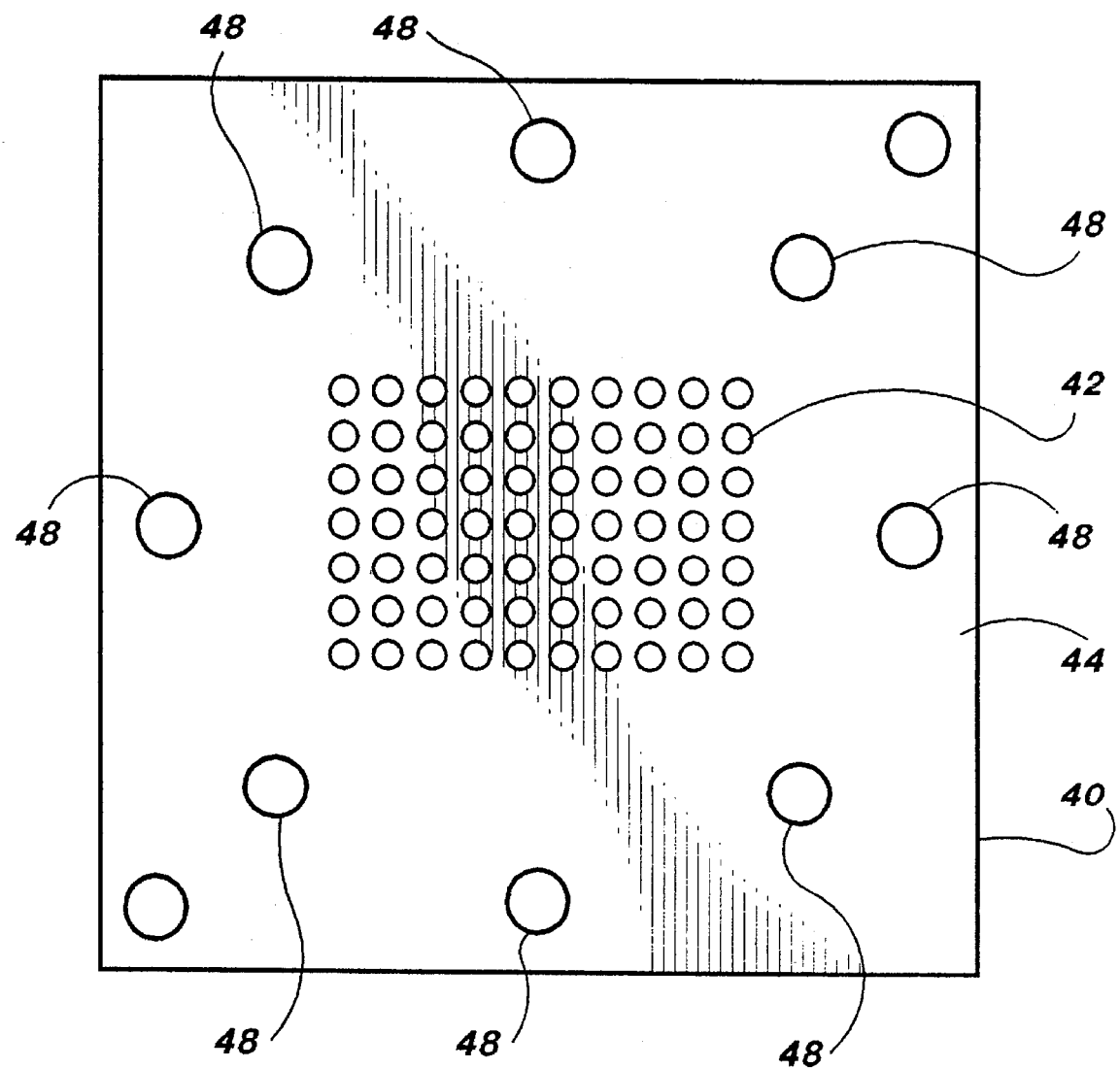
FIG. 6C is a front elevated view of a first alternative embodiment of the stranding die plate of FIG. 2.

A first alternative embodiment of the stranding die 40 is shown in FIG. 6C. Here the multiple apertures 42 are not contained within an area defined by the shape of the second orifice 38 of the transition die 25. Instead, the multiple apertures 42 may be contained within any given area located within that area defined by the bolt holes 48. When the front face 44 of the stranding die 40 is secured to the rear face 30 of the transition die 25, the extruded material will be forced through the multiple apertures 42 which are contained within the area defined by the shape of the second orifice 38 of the transition die 25.

Figure 8:
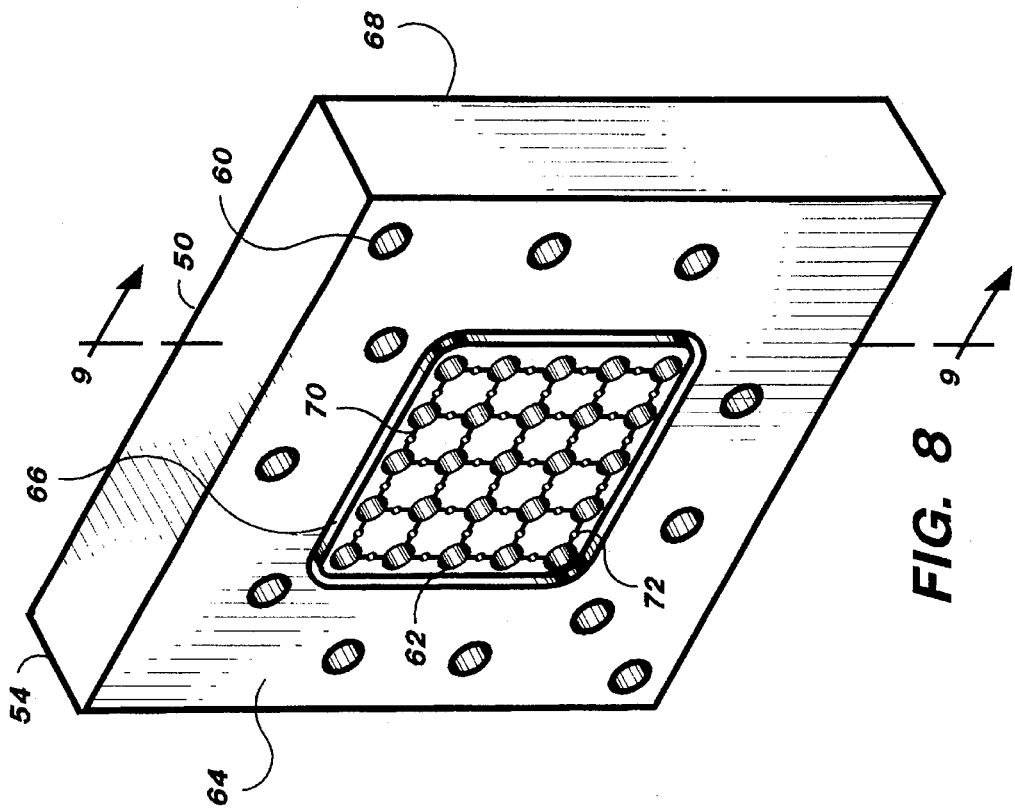
FIG. 8 is a perspective view of the rear plate of the stranding die plate of FIG. 7.
Figure 7:
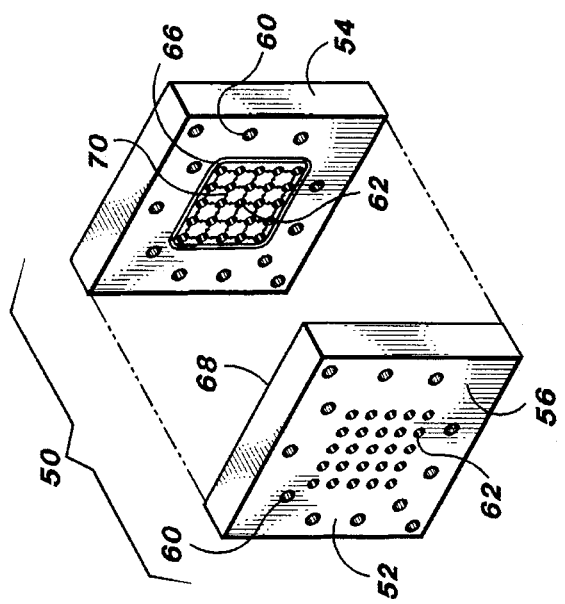
FIG. 7 is an exploded perspective view of a second alternative embodiment of the stranding die plate of FIG. 2.
Figure 9:
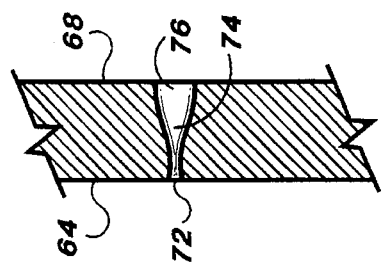
FIG. 9 is a partial cross-sectional view of the stranding die plate of FIG. 8 taken at lines 9—9 of FIG. 8.

Gas-Evacuation Stranding Die:

In a second alternate embodiment, illustrated in FIGS. 7–9, a gas-evacuation stranding die 50 facilitates removal of unwanted process gasses which are present when using volatile cross-linking agents. In the "gas-evacuation" embodiment, the stranding die is configured such that it facilitates removal of unwanted process gases which are present when using volatile cross-linking agents. This is particularly important for some of the products which emit gases during the processing.

As illustrated in FIG. 7, a gas-evacuation stranding die embodiment 50 comprises two metal plates, 52,54, each approximately 1½ inches thick. The first plate 52 includes a front first face 56, a rear second face 58 and bolt holes 60 used for assembly to other dies. The first plate 52 also includes multiple stranding apertures 62 arranged in a manner which facilitates proper volume distribution for the final product. The rear second face 58 of the first plate 52 and a front first face 64 of the second plate 54 register with each other such that the stranding apertures 62 align. A channel 66 surrounds the perimeter of the stranding apertures 62 between the first plate 52 and the second plate 54 sealing the apertures 62. The second plate 54 has a front first face 64 and a rear second face 68 with stranding apertures 62 aligned axially with the stranding apertures 62 located on the first plate 52. Also located on the first face 64 of the second plate 54 are channels 70 connecting each of the stranding apertures 62, in a grid-like pattern. Inlets 72 of vents 74 are disposed on the first face 64 within the channels 70, located at a midpoint between each of the stranding apertures 62 in the preferred embodiment. The vents 74 are of smaller circumference than the stranding apertures 62. Outlets 76 of vents 74 are disposed in the second face 68.

In either embodiment, the shearing action of the stranding die creates local high temperatures on the outside of each individual strand, while the interior bulk of each strand remains at a lower temperature. In the gas evacuation embodiment, the stranding die 50 is configured such that it facilitates removal of unwanted process gasses which are present when using volatile cross-linking agents. The unwanted gasses evacuate through the channels 70 which direct the gasses to the inlets 72, passing the gasses through the vents 74 and out through the outlets 76.

As illustrated in FIG. 9, the preferred embodiment, the outlets 76 have a larger circumference than the inlets 72, with the vents 74 providing a gradual increase in circumference. The shape of the vents 74 provides a venturi-type system with the low-pressure outlets 76 supplying a vacuum to pull the unwanted gasses away from the strands.

Molding Die:

After the strands of homogenized material pass through the multi-apertured stranding die, they are compressed together in a molding die 78 to form the final shape. The heated, compressed cellulose molecular chains are then bound together. This bonding may be facilitated by cross-linking agents. The heat dissipates from the exterior of the surface of each strand to give a blended stock temperature, but only after the strands have bonded. The strands bond because of the higher external temperature, which then dissipates the heat through the whole profile of the forming product.

Figure 10:
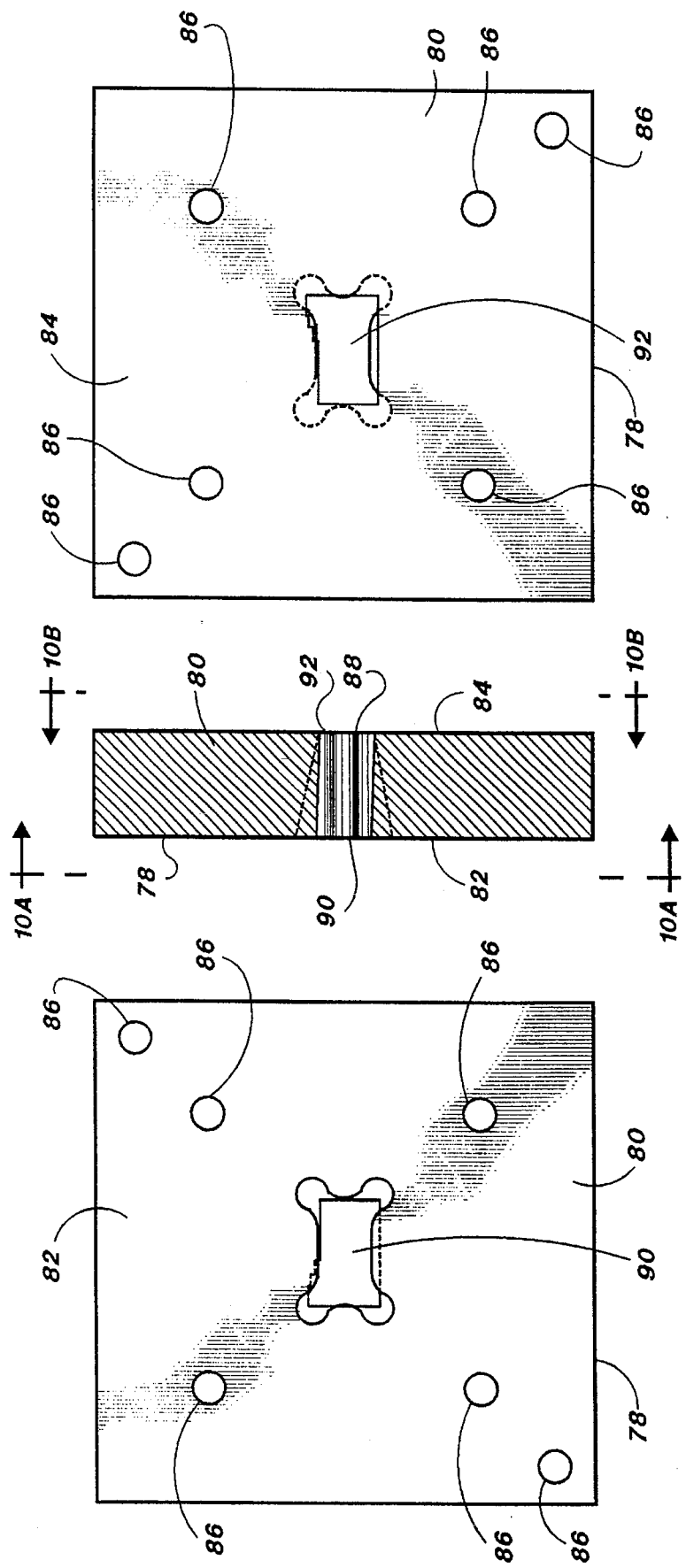
FIG. 10 is a cross-sectional view of the molding die plate of FIG. 2.

The strands are compressed and shaped in a molding die 78, shown in FIGS. 10, 10A, and 10B. The heated outer surface of each of the strands acts to anneal the strands together. In addition, as the individual strands are compressed against each other, the localized high temperatures on the outer surface of each strand cause the bonding of the thermoset materials to pendent hydroxy units on the cellulose molecular chain. If cross-linking agents are included in the starting material, the cross-linking agents act to form an exothermic reaction on the outer surface of each strand thereby facilitating the bonding of the thermoset materials to pendant hydroxy units on the cellulose molecular chain.

The molding die 78 is a square-shaped metal plate 80, approximately one and one-half inches thick having a front face 82, a rear face 84 and bolt holes 86 for assembly with the other dies in the system. The molding die 78 further comprises a conduit 88 having a first oblong shaped orifice 90 similar in shape to the second orifice 38 of the transition die 25 and a second orifice 92 which may be identical to the shape of the desired end product.

The first orifice 90 comprises part of the from face 82 of the molding die 78 while the second orifice 92 comprises part of the rear face 84 of the molding die 78. The front face 82 of the molding die 78 is secured to the rear face 58 of the stranding die 50. The conduit 88 functions to compress and transform the composite material extruded from the stranding die 50 to the shape of the finished product.

One of the main advantages to this process is that the molded product has virtually no expansion after it leaves the molding die. This is due to the low temperature processing in the extruder and die system.

Molding dies 78 of any shape are contemplated within this invention, including decorative household moldings such as crown moldings, chair rails, baseboards, door moldings, etc., picture frames, furniture trim and other products mentioned in this application.

Figure 11:
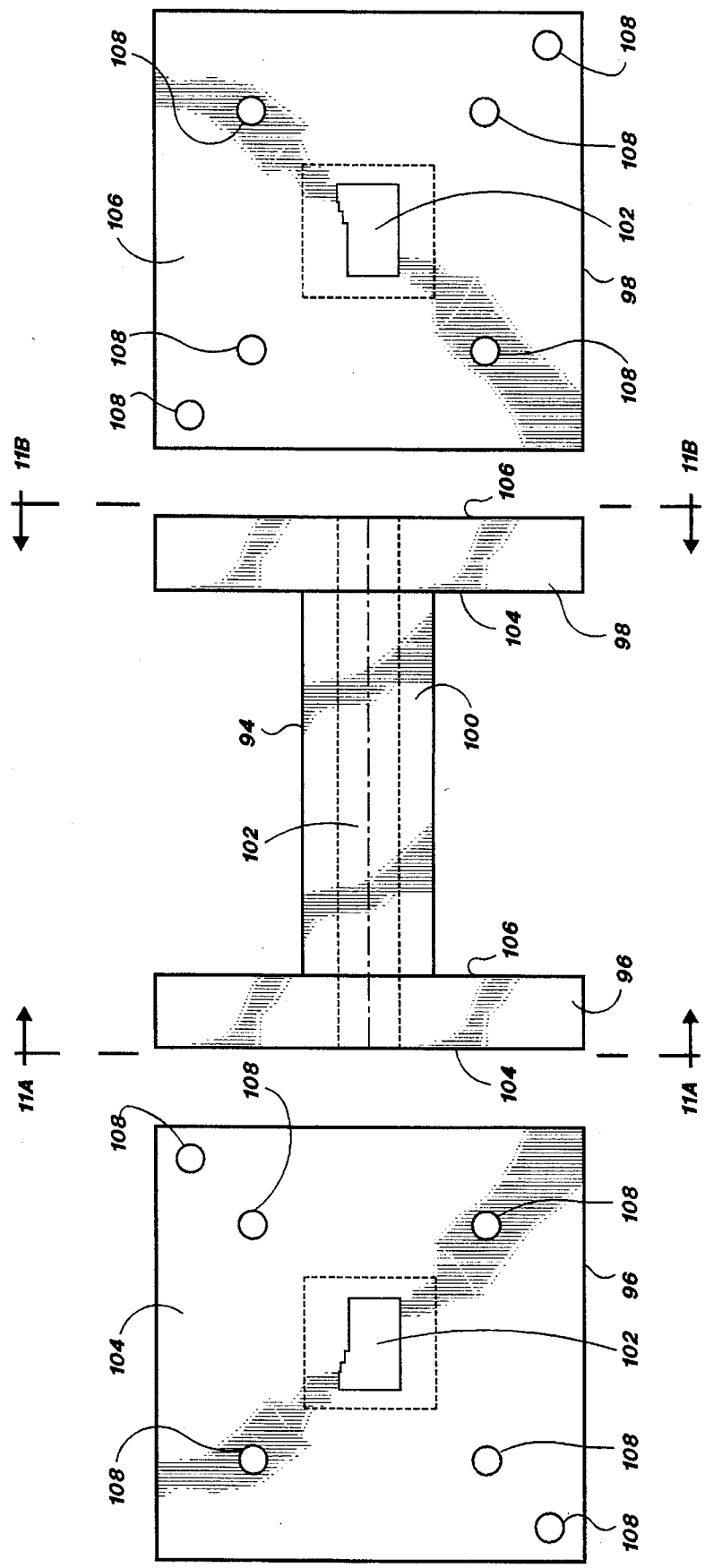
FIG. 11 is a cross-sectional view of the setting die plate of FIG. 2.

Setting Die:

In the setting die 94, the final shape is maintained. If cross-linking agents are included in the starting material, the cross-linking agents continue to react in the setting die 94, thereby bonding the individual strands together. The setting die 94, illustrated in FIGS. 11, 11A, and 11B, is a combination of two metal plates, a first plate 96 and a second plate 98 each approximately one and one-half inches thick joined by a hollow metal sleeve 100. The hollow cavity 102 contained within the metal sleeve 100 is configured in the shape of the final product. FIG. 11A shows the front face 104 of each of the first and second plates 96,98 and FIG. 11B shows the rear face 106 of each of the first and second plates 96,98. Bolt holes 108 allow the front face 104 of the first plate 96 to be bolted and secured to the rear face 84 of the molding die 78.

Spray-Head System:

The preferred embodiment of the system of the present invention includes a spray-head system 95 positioned between the die system 14 and the cooling tank 110. Referring the FIGS. 1, 2 and 12, there is shown a preferred spray-head system 95. The spray head may comprise any suitable configuration designed to a cooling fluid, such as water, antifreeze or another suitable liquid on the extrudate, i.e., the hot molded piece, as the extrudate leaves the die system 14.

In its preferred embodiment, the spray-head system comprises at least one and preferably three hollow-tubular and circularly-shaped spray rings 97. The spray rings are made of any material known to the art for transporting a cooling fluid. Suitable materials include plastics, rubber and metal, such as stainless steel or brass piping.

Figure 12:
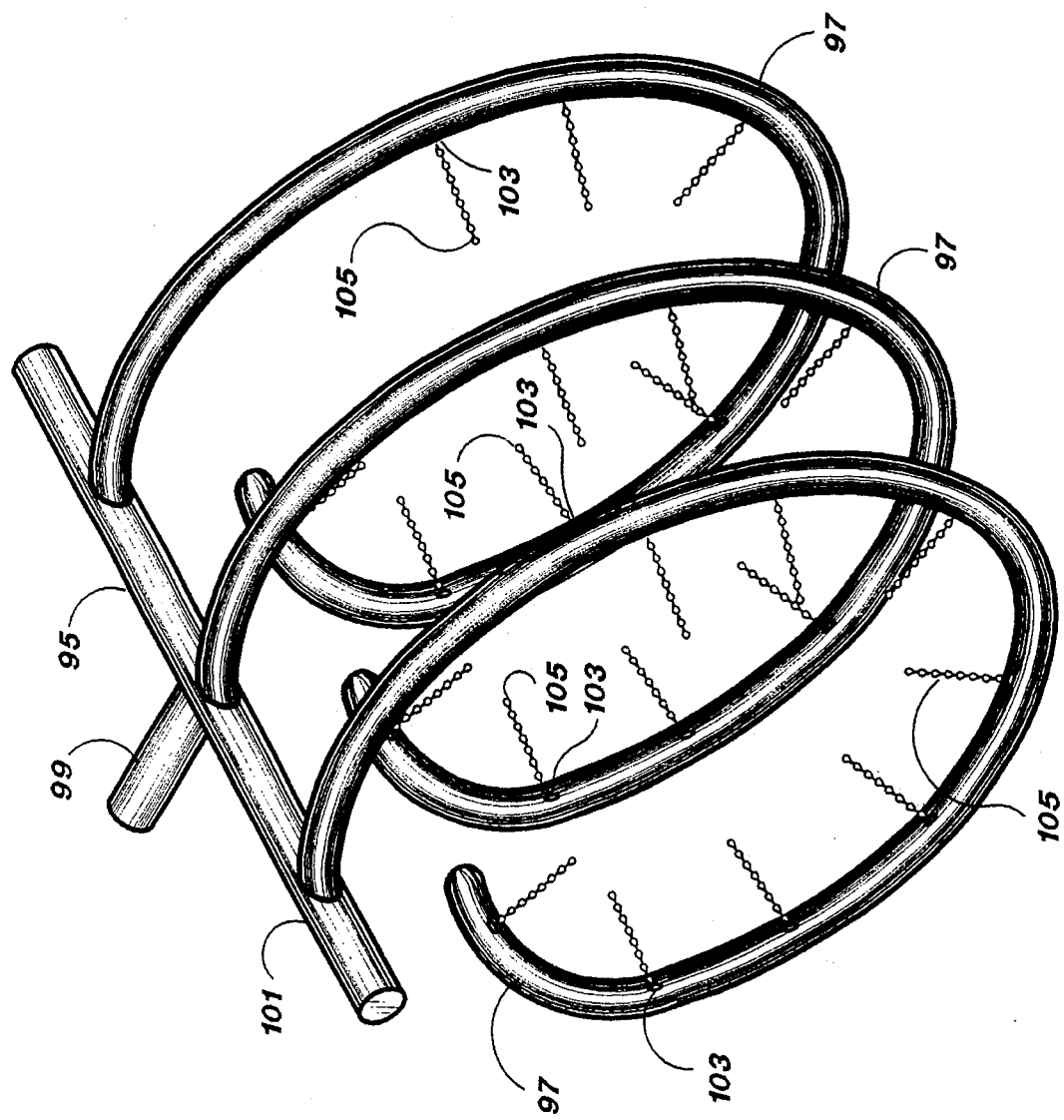
FIG. 12 is a perspective view of a spray head system illustrated in FIGS. 1 and 2.

The spray rings 97 are connected to fluid input conduit 99, which passes pressurized fluid to the rings 97. As illustrated in FIG. 12, the fluid conduit 99 can be a central dispensing tube connected to a multiple of spray rings 97 by a connector unit 101. Each of the spray rings 97 include at least one and preferably a plurality of ejection ports 103, for releasing the pressurized fluid 105 into the central environment defined by the shape of the spray rings 97.

In use, the molded extrudate exits the setting die 94 of the die system. Before the molded extrudate is given the opportunity to make substantial contact with air, the extrudate enters the spray-head system 95, which provides a spray of fluid 105 to soaks the extrudate. The pressure of the spray can be intense, similar to a spray from a typical garden hose, it can be mist-like atomizing spray, or it have an intermediate pressure depending upon the type of extrudate and the finish desired on the extrudate. If the spray hits the extrudate before the extrudate cools from the die system 14 and before the extrudate enters the atmosphere, the spray imparts a hardened gloss or glaze on the hot-molded extrudate and assists in preventing blistering and deformation on the surface of the molded extrudate. Without wishing to be restricted to any one reason for this occurrence, it is believed that the action of the spray on the molded extrudate prior to atmospheric contact, reacts with the urethane ingredient in the extrudate thereby imparting the hardened glaze on the product.

Cooling Tank:

After the molded product leaves the molding die, it is fed to a vented cooling tank 110, which is a conveyor system (known to the art) for conveying the material through a cooling process which may be under negative pressure especially if the product has hollow cores. A representative conveyor-type cooling tank is produced by Cincinnati Milacron. The cooling tank may include a vacuum water bath in the preferred embodiment. The length of the formed product is determined by the length of the cooling tank. Therefore, another advantage of the product is that it has potentially unlimited length in that it can continually be extruded from the system.

The formed product is cooled in the vented cooling tank and transported over rollers by a pulling mechanism 112 known to the art. The cooled product is then cut to the desired lengths using conventional means.

The product can then be covered with a vinyl material, plastic laminate, paint or other suitable coverings known to the art. An inline crosshead extrusion die, known to the art, may be installed down-stream of the puller to apply a capstock of known compounds as an exterior finish.

The foregoing is considered as illustrative only of the principles of the invention. Further, since numerous modifications and changes will readily occur to those skilled in the art, it is not desired to limit the invention to the exact construction and operation shown and described. Accordingly, all suitable modifications and equivalents fall within the scope of the invention.

What is claimed is:

1. A process for the production of a composite material from particles of cellulosic material comprising the steps of:
   a. combining the cellulosic material with a sufficient amount of thermoplastic material to form a combined product;
   b. extruding the combined product under sufficient conditions to blend the combined product together into a homogeneous mixture;
   c. passing the homogeneous mixture through a transition die to pre-shape the homogeneous mixture into a shape approximating that of a finished product and to expand the homogeneous mixture;
   d. passing the homogeneous mixture through a stranding die to form a plurality of adjacently positioned strands of homogeneous mixture; and
   e. passing the plurality of strands through a molding die for a time sufficient to compress the strands together and bond the strands to each other.

2. The process of claim 1 further comprising the step of passing the homogeneous mixture through an adapter die to control a volume of the homogeneous mixture allowed into the transition die.

3. The process of claim 1, wherein the cellulosic material is selected from the group consisting of newspapers, alfalfa, wheat pulp, wood flour, wood flakes, wood fiber, ground wood, wood veneers, wood laminates, paper, cardboard, straw, and mixtures thereof.

4. The process of claim 1 wherein the cellulosic material is shredded or fibered.

5. The process of claim 1 further comprising drying the cellulosic material prior to step a. to a moisture content between about 1% and 9%.

6. The process of claim 1 further comprising drying the cellulosic material prior to step a. to a moisture content of 2%.

7. The process of claim 1 wherein the thermoplastic material is selected from the group consisting of multi-layer films, poly-vinyl chloride, polyolefins, copoly-ethylene-vinyl acetate and waste plastic sawdust.

8. The process of claim 1 wherein the ratio of cellulosic material to thermoplastic material is between approximately 1:1 and 1:0.

9. The process of claim 1 wherein the combined product is extruded at a temperature as low as about 100° F.

10. The process of claim 1 wherein the combined product is extruded at a temperature between about 100° F. and 400° F.

11. The process of claim 1 wherein the combined products is extruded at a temperature between about 150° F. and 200° F.

12. The process of claim 1 wherein the combined product is extruded at a temperature of about 180° F.

13. The process of claim 12 wherein the flow rate of the extruder is between approximately 100 and 2500 pounds per hour.

14. The process of claim 12 wherein the flow rate of the extruder is approximately 600 pounds per hour.

15. The process of claim 1 further comprising combining the cellulosic material with the thermoplastic material in the presence of a cross-linking agent.

16. The process of claim 15 wherein the cross-linking agent is selected from the group consisting of polyurethanes, phenolic resins, unsaturated polyesters and epoxy resins.

17. The process of claim 1 further comprising combining the cellulosic material with the thermoplastic material in the presence of a lubricant.

18. The process of claim 17 wherein the lubricant is selected from the group consisting of zinc stearate and paraffin-type wax.

19. The process of claim 1 further comprising combining the cellulosic material with the thermoplastic material in the presence of one or more of the following: accelerators, inhibitors, enhancers, compatibilizers and blowing agents.

20. The process of claim 1 wherein each of the plurality of adjacent positioned strands has a surface temperature hotter than an interior temperature of each strand.

21. The process of claim 1 wherein the stranding die is a multi-aperture die comprising means to increase the temperature of the outer surface of each of the strands that are formed in the die.

22. The process of claim 21 wherein the stranding die comprises multiple apertures arranged in a manner to facilitate proper volume distribution for the strands, wherein all of the apertures are substantially round.

23. The process of claim 22 wherein the multiple apertures each comprise a diameter of approximately one-eighth of an inch.

24. The process of claim 1 wherein the stranding die is a gas-evacuation stranding die comprising means to facilitate the removal of unwanted process gases which are present when using volatile cross-linking agents.

25. The process of claim 1 comprising after passing the homogenous strands through the molding die, passing the strands through a settling die for a time sufficient to bond the individual strands together to a molded extrudate.

26. The process of claim 25 comprising spraying the molded extrudate with a cooling fluid sufficient to impart a hardened glaze on the molded extrudate.

27. The process of claim 26 wherein the fluid is water.

28. The process of claim 26 comprising spraying the molded extrudate prior to exposing the extrudate to air.

29. The process of claim 1 further comprising cooling the formed product.

30. The process of claim 29 comprising cooling the formed product under negative pressure.

31. A process for the production of a composite material from particles of cellulosic material comprising the steps of:
   a. drying the cellulosic material to a moisture content between about 1% and 9%;
   b. combining the cellulosic material with a sufficient amount of thermoplastic material in the presence of a cross-linking agent and a lubricant to form a combined product, wherein the ratio of cellulosic material to thermoplastic material is between approximately 1:1 and 1:0;
   c. extruding the combined product under sufficient conditions to blend the combined product together into a homogeneous mixture, wherein the combined product is extruded at a temperature between about 100° F. and 400° F., and wherein the flow rate of the extruder is between approximately 100 and 2500 pounds per hour;
   d. passing the homogenous mixture through a transition die to preshape the homogeneous mixture into a shape approximating that of a finished product and to expand the homogeneous mixture;
   e. passing the homogeneous mixture through a stranding die to form a plurality of adjacently positioned strands of homogeneous mixture, wherein each of the plurality of adjacent positioned strands has a surface temperature hotter than an interior temperature of each strand;
   f. passing the plurality of strands through a molding die for a time sufficient to compress the strands together and bond the strands to each other;
   g. passing the strands through a settling die for a time sufficient to bond the individual strands together to a molded extrudate;
   h. spraying the molded extrudate with a cooling fluid sufficient to impart a hardened glaze on the molded extrudate; and
   i. cooling the formed product.

32. The process of claim 31 wherein the cellulosic material is selected from the group consisting of newspapers, alfalfa, wheat pulp, wood flour, wood flakes, wood fibers, ground wood, wood veneers, wood laminates, paper, cardboard, straw, and other cellulosic fibrous materials.

33. The process of claim 31 wherein the cellulosic material is shredded or fibered.

34. The process of claim 31 wherein the thermoplastic material is selected from the group consisting of multi-layer films, poly-vinyl chloride, polyolefins, copoly-ethylene-vinyl acetate and waste plastic sawdust.

35. The process of claim 31 wherein the combined products is extruded at a temperature between about 150° F. and 200° F.

36. A low-temperature extruder system for forming a composite molded extrudate from a mixture of organic fibrous material and thermoplastic material, comprising:
   a. a hopper to receive and form a mixture of the organic fibrous material and the thermoplastic material;
   b. an extruder to extrude the mixture;
   c. a first transition die comprising an aperture to receive the mixture and form it to an initial shape and to extrude the formed mixture;
   d. a second stranding die, connected to the first transition die, provided with a plurality of stranding apertures to receive and shear the formed mixture into a plurality of individual strands each having an exterior surface;
   e. a third molding die, connected to the second stranding die, provided with an aperture to receive and compress the individual strands into a final molded shape; and
   f. a fourth shaping die, connected to the third molding die, provided with an extrudate shape-forming aperture for molding the molded extrudate.

37. The low temperature extruder system of claim 36 further comprising an adapter die located between the extruder and the first transition die, the adapter die being provided with an aperture to control the amount of mixture entering the first transition die.

38. The low temperature extruder system of claim 36 wherein the first transition die comprises a first front face having a generally round orifice and a second rear face having an orifice similar to a shape of a finished product.

39. The low temperature extruder system of claim 36 wherein the third molding die comprises a first front face equivalent in shape to the second rear face of the first transition die and a second rear shape-forming face to form the shape of the molded extrudate.

40. The low temperature extruder system of claim 36 wherein the second stranding die comprises a first surface and a second surface, comprising:
   a. a plurality of gas evacuation channels located on the first surface of the second die to receive and evacuate gases discharged from shearing the formed mixture; and
   b. a plurality of gas evacuation vents, having inlets located on the first surface connected to the gas channels and outlets located on the second surface, for receiving and evacuating gases from the gas evacuation channels.

41. The low temperature extruder system of claim 40 wherein the gas evacuation vent outlets have a larger circumference than the inlets, providing a venturi effect to increase gas evacuation efficiency.

42. The low temperature extruder system of claim 40 wherein the gas evacuation channels are connected to the stranding apertures in a grid formation.

43. The low temperature extruder system of claim 40 wherein the gas evacuation vents are located substantially at a midpoint between the stranding apertures.

44. The low temperature extrude system of claim 36 further comprising a spray head system for receiving the molded extrudate passing from fourth shaping die.

45. A low-temperature extruder system for forming a composite molded extrudate from a mixture of organic fibrous material and thermoplastic material, comprising:
   a. a hopper to receive and form a mixture of the organic fibrous material and the thermoplastic material;
   b. an extruder to extrude the mixture;
   c. an adapter die connected to the extruder, the adapter die being provided with an aperture to control the quantity of mixture flowing from the extruder;
   d. a first transition die comprising an aperture to receive the mixture and form it to an initial shape and to extrude the formed mixture, wherein the first transition die comprises a first front face having a generally round orifice and a second rear face having an orifice similar to a shape of a finished product;

e. a second stranding die, connected to the first transition die, provided with a plurality of stranding apertures to receive and shear the formed mixture into a plurality of individual strands each having an exterior surface, wherein the second stranding die comprises a first surface and a second surface, comprising:
   i. a plurality of gas evacuation channels located on the first surface of the second die to receive and evacuate gases discharged from shearing the formed mixture; and
   ii. a plurality of gas evacuation vents, having inlets located on the first surface connected to the gas channels and outlets located on the second surface, for receiving and evacuating gases from the gas evacuation channels, wherein the gas evacuation vent outlets have a larger circumference than the inlets, providing a venturi effect to increase gas evacuation efficiency;

f. a third molding die, connected to the second stranding die, provided with an aperture to receive and compress the individual strands into a final molded shape, wherein the third molding die comprises a first front face equivalent in shape to the second rear face of the first transition die and a second rear shape-forming face to form the shape of the molded extrudate;

g. a fourth shaping die, connected to the third molding die, provided with an extrudate shape-forming aperture for molding the molded extrudate; and h. a spray head system for receiving the molded extrudate passing from fourth shaping die.

* * * * *